United States Patent
Redin Gorraiz

(10) Patent No.: US 6,713,006 B1
(45) Date of Patent: Mar. 30, 2004

(54) PROCESS FOR MANUFACTURING A SHOE AND SHOE MANUFACTURED USING SAID PROCESS

(75) Inventor: Juan Redin Gorraiz, Aoiz 9, 31004 Pamplona (Navarra) (ES)

(73) Assignees: Dansko International Inc., West Grove, PA (US); Juan Redin Gorraiz, Pamplona (Navarra) (ES)

( * ) Notice: Subject to any disclaimer, the term of this patent is extended or adjusted under 35 U.S.C. 154(b) by 36 days.

(21) Appl. No.: 10/048,274

(22) PCT Filed: Oct. 13, 2000

(86) PCT No.: PCT/ES00/00390
§ 371 (c)(1),
(2), (4) Date: Jan. 28, 2002

(87) PCT Pub. No.: WO01/89336
PCT Pub. Date: Nov. 29, 2001

(51) Int. Cl.[7] ............................ B29C 45/14; B29C 65/70
(52) U.S. Cl. ...................... 264/154; 264/244; 264/263; 264/267; 264/274; 36/103
(58) Field of Search ............................. 264/244, 254, 264/250, 259, 261, 263, 266, 267, 271.1, 274, 275, 294; 36/87, 83, 103, 32 R, 43, 44

(56) References Cited

U.S. PATENT DOCUMENTS

| | | | | |
|---|---|---|---|---|
| 3,345,664 A | * | 10/1967 | Ludwig | 12/142 R |
| 3,426,120 A | * | 2/1969 | Szerenyl et al. | 264/244 |
| 3,522,340 A | * | 7/1970 | Corcoran et al. | 264/161 |
| 3,676,542 A | * | 7/1972 | Maltby | 264/244 |
| 3,942,206 A | | 3/1976 | Diamant | |
| 3,983,204 A | * | 9/1976 | Opinsky et al. | 264/244 |
| 4,032,611 A | * | 6/1977 | Fukuoka | 264/244 |
| 4,316,332 A | | 2/1982 | Giese et al. | |
| 4,561,140 A | * | 12/1985 | Graham et al. | 12/146 BR |
| 4,580,359 A | | 4/1986 | Kurrasch et al. | |
| 4,616,430 A | * | 10/1986 | McQuiggin | 36/14 |
| 4,651,444 A | * | 3/1987 | Ours | 36/93 |
| 4,854,841 A | * | 8/1989 | Graf et al. | 425/119 |
| 5,146,697 A | | 9/1992 | Weiss | |

FOREIGN PATENT DOCUMENTS

| | | |
|---|---|---|
| EP | 0 329 391 | 8/1989 |
| ES | 161 038 | 10/1970 |
| ES | 2 116 483 | 7/1998 |
| WO | WO98/23178 | 6/1998 |

* cited by examiner

*Primary Examiner*—Angela Ortiz
(74) *Attorney, Agent, or Firm*—Collard & Roe, P.C.

(57) ABSTRACT

The shoe is obtained by depositing wedge (2), with or without a midsole (1), under the last incorporating cut (5), sewn to a gridded insole (6) and so that the top surface of the closure ring (4.1), a single one per size, of semimould (4) of outsole or sole (3) to be injected meets the top edge of wedge (2), then injecting the plastic of outsole or sole (3), which is of the same family as that of wedge (2), so that they fuse together, to which resulting set may or may not be later added the lower skid.

5 Claims, 3 Drawing Sheets

PROCESS FOR MANUFACTURING A SHOE AND SHOE MANUFACTURED USING SAID PROCESS

CROSS REFERENCE TO RELATED APPLICATIONS

Applicant claims priority under 35 U.S.C. §120 of PCT/ES00/00390 filed Oct. 13, 2000. The international application under PCT article 21(2) was not published in English.

OBJECT OF THE INVENTION

The present invention relates to a shoe construction method and shoe obtained thereof, among the various construction methods for these products by injection, whether open, semiopen, or closed, incorporating a wedge, with or without a stiffening midsole for said wedge, attached to a stitching insole which is secured to the sole or intermediate outsole.

This invention is characterised by a particular construction of the stitching insole, in the form of a bottom grid either ribbed or not ribbed, and sewn to the bottom end of the cut.

If a midsole is present it is made from a suitable plastic material and inserted at various levels inside the wedge, as well as having a perforated structure and provided with rear lower stiffening plates.

A ring closing the sole or outersole injection is provided individually for each size, and valid for any shoe construction.

BACKGROUND OF THE INVENTION

Except for very special cases of limited use, with mechanical securing such as by placing an injected polyurethane insole between a thick mesh fabric, with sufficient space allowed for the molten mass to enter, which in turn is inserted in the mass of a rubber skid, there are four basic and widespread methods for constructing various types of shoe, all of which include an upper wedge, a stitching insole and a sole, with or without an intermediate outsole, namely: the glued-mounted type, the sewn-sandal type, the Goodyear welt type and the direct injection type.

The glued mounted type requires prior cleaning of the wedge, chemical carding (chlorine with solvent), subsequent application of a reactivable adhesive at 90–100° C., mounting and later pressing.

The sewn-sandal type is a manufacturing method in which after mechanical carding the sole or outsole extending portion is sewn to the edge of the cut, bent outwards.

The method known as Goodyear welting is a stitching inverted with respect to the sewn-sandal type, that is with it facing the inside of the shoe.

Lastly, direct injection characterised by its high adherence is generally not recommendable when the leather is not too porous and when the alternative fabric is very closed, requiring carding not only of the base but also of the sides of the cut, with the ensuing increase in costs and time.

Regarding this last method, in order to perform the lateral injection of the thermoplastic material of a sole or prior outsole within a mould in which is deposited a cut incorporating a last which presses on the wedge, a ring is required to close the outlet of injected product through the area common to the lower edge of the cut and the upper edge of the mould, requiring as many rings as shoe sizes are to be made, whether closed, open or semiopen.

In open or semiopen shoes the cut outline is staggered, resulting in a difficult coupling of the closing ring, allowing leakage of the molten product through the openings of the shoe and the ensuing poor appearance as the edges of the wedge are unevenly covered.

On the other hand, stiff midsoles which prevent breaking of the shoe arch and allow an elastic transmission of motion from the rear of the shoe to the front as the user walks or runs are well known elements long incorporated in shoes, therefore not requiring any further information.

Midsoles are also used as means for elastic motion recovery in certain activities, such as in ballet shoes, where they may consist of a metal strip. Double midsoles also exist for reinforcing odd antianatomical postures and as reinforcements of vamp structures, which range beyond the scope of the present invention.

The midsole is glued or sewn to the top of the sole, and on top of it is usually placed the insole, and on occasion a fine finish insole, such as one of multiperforated leather. It is also glued or secured inside the insole, as well as to its top or bottom.

There also exist midsoles which are integrated in the sole structure where there is a progressive bend, as well as special ones for reinforcing the toe or heel, semi integrated in said sole and also between the cut and the padding before the internal lining of the shoe, for specific industrial purposes.

In addition, cuts of varying height according to the irregular height of the wedge, ranging from a few millimetres at the sole to about a centimetre in the bend area and several centimetres on the side of the heel area, may incorporate a sewn fabric ribbon and/or a felt insole sewn by the Ströbel method.

The applicant is not aware of means which prevent undesired leakage of plastic material through the mould closure ring area, nor of midsoles embedded in the same plastic mass as the sole, of the characteristics which described here forth.

Lastly, when the cut is placed inside out and then attached to the sole such as when sewn to an insole, as mentioned above by the Ströbel method, with any easily cut material which allows sewing such as in a felt stitching insole, there are no good means of securing to the sole material if the cut integrated in it is to be incorporated in said sole.

The applicant is also unaware of other records which allow the turned material of the cut and the sewn insole to be integrated into the molten mass of the sole and much less for the midsole to be so likewise in the wedge.

DESCRIPTION OF THE INVENTION

The invention object of the present memory relates to a shoe construction method from among the various means for constructing said products for human clothing, employing double injection whether open, semiopen or closed, as well as within shoes having a wedge whose bottom surface aids in inserting the outwards-turned segment of the cut in the mass of the sole itself or the outsole, as well as those provided or not with a midsole integrated in the wedge.

It is essentially characterised in that it employs a single closing ring for the semi moulds of the outsole or sole of the shoe, regardless of its finish, whether open, closed or semiopen, so that the same ring may be used for any type of shoe without resulting in upper leakage of the injected material other than those defined constructively for absorbing excess products in perimetral recesses of the last, resulting in ridges which are later removed manually.

The invention is also characterised by a special construction of the area beneath the wedge which, both for the later insertion of the cut which encompasses the wedge both to the sole and outersole, incorporates a gridded stitching insole, located beneath, which may be ribbed or not, and arranged so that it aids in tightening the cut.

For this purpose the grid is made from a plastic material with a suitable resistance during the sewing operation, either prefabricated with edge closures which aid in this sewing or of a fabric tailor-cut for each insole and suitably ribbed, so that the stitch, in addition to being secured to the cut, may be secured to the grid ribbing.

It is also characterised, as an option, by a midsole constructed in a particular manner based on a multiperforated sheet through which may easily pass the thermoplastic coating material and with two rear perimetral stiffeners, with an irregular triangular shape, curving in the rear until they face each other in the end of the heel, aside from a further two upper stiffening ribs on the bend of the sole.

The midsole in the wedge is preferably constructed from a thermoplastic material of suitable stiffness and hardness, such as high density polyethylene, inserted at a variable level in said wedge, depending on the type of surface hardness desired on the foot rest area, ranging from a few millimetres of distance to the top surface for clogs to the middle of the wedge or even below this level for a soft shoe.

As regards the wedge material, it is the same as that of the sole or outsole, preferably polyurethane, ideally low density for the wedge and high density for the lower part.

If desired, the wedge thus constructed with the midsole may be partially or fully covered with a lining suitable for contact with the skin or sock of the user, as well as an insole placed on top of the lining.

The shoe is constructed by placing the wedge with or without a midsole under the last which incorporates the cut, which extends downwards by an identical height along its entire perimeter, and then stitching the gridded insole so that the top surface of the closing ring for the semi mould of the outersole or sole to be injected meets the top surface of the wedge, before injecting the sole or outersole to which the lower skid is later incorporated.

DESCRIPTION OF THE DRAWINGS

The present description is complemented by a set of accompanying drawings where for purposes of illustration and in a nonlimiting manner the following is shown.

PREFERRED EMBODIMENT OF THE INVENTION

Figure 1:
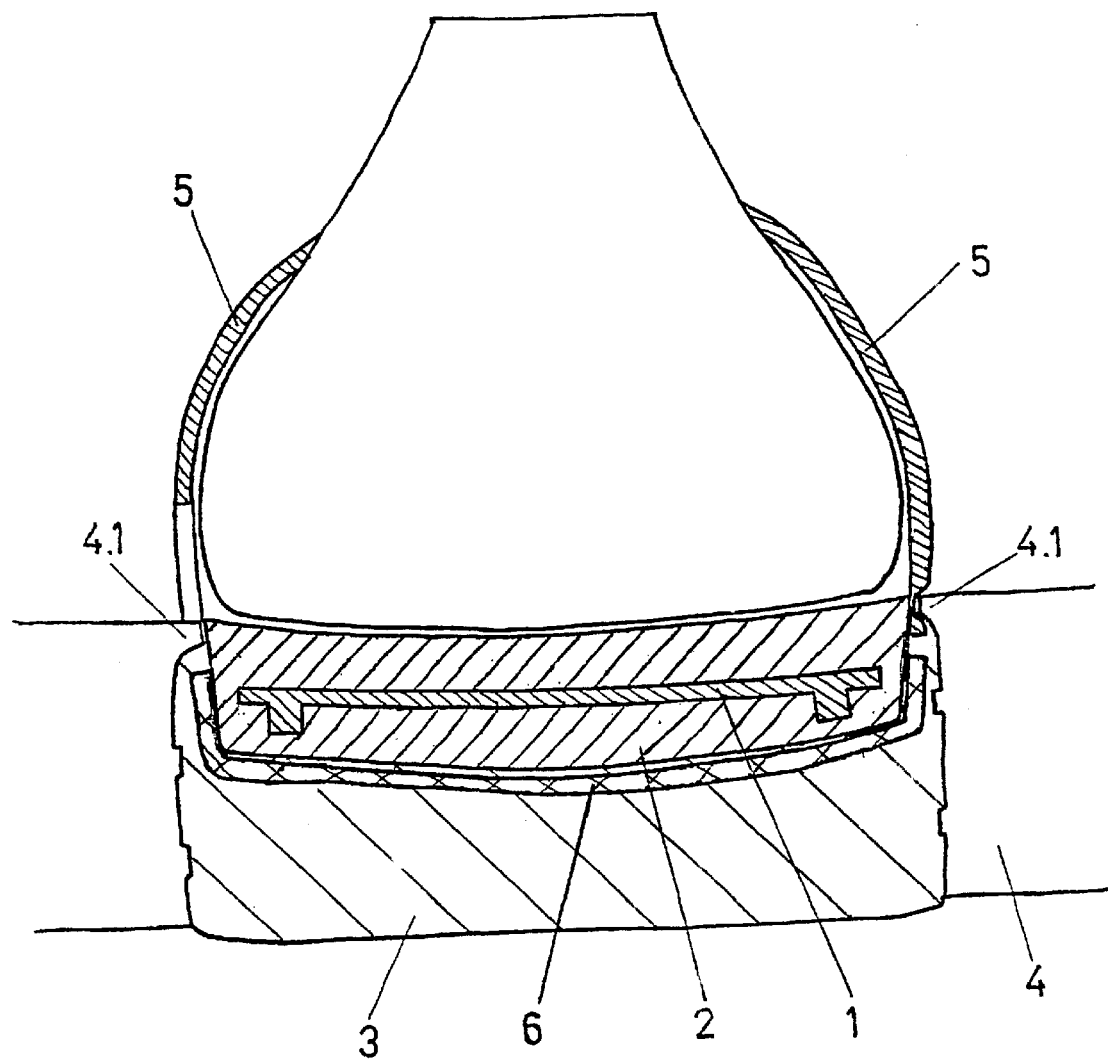
FIG. 1 is a cross sectional view of a semiopen shoe showing the last, the unlined wedge and with the midsole and sole.
Figure 2:
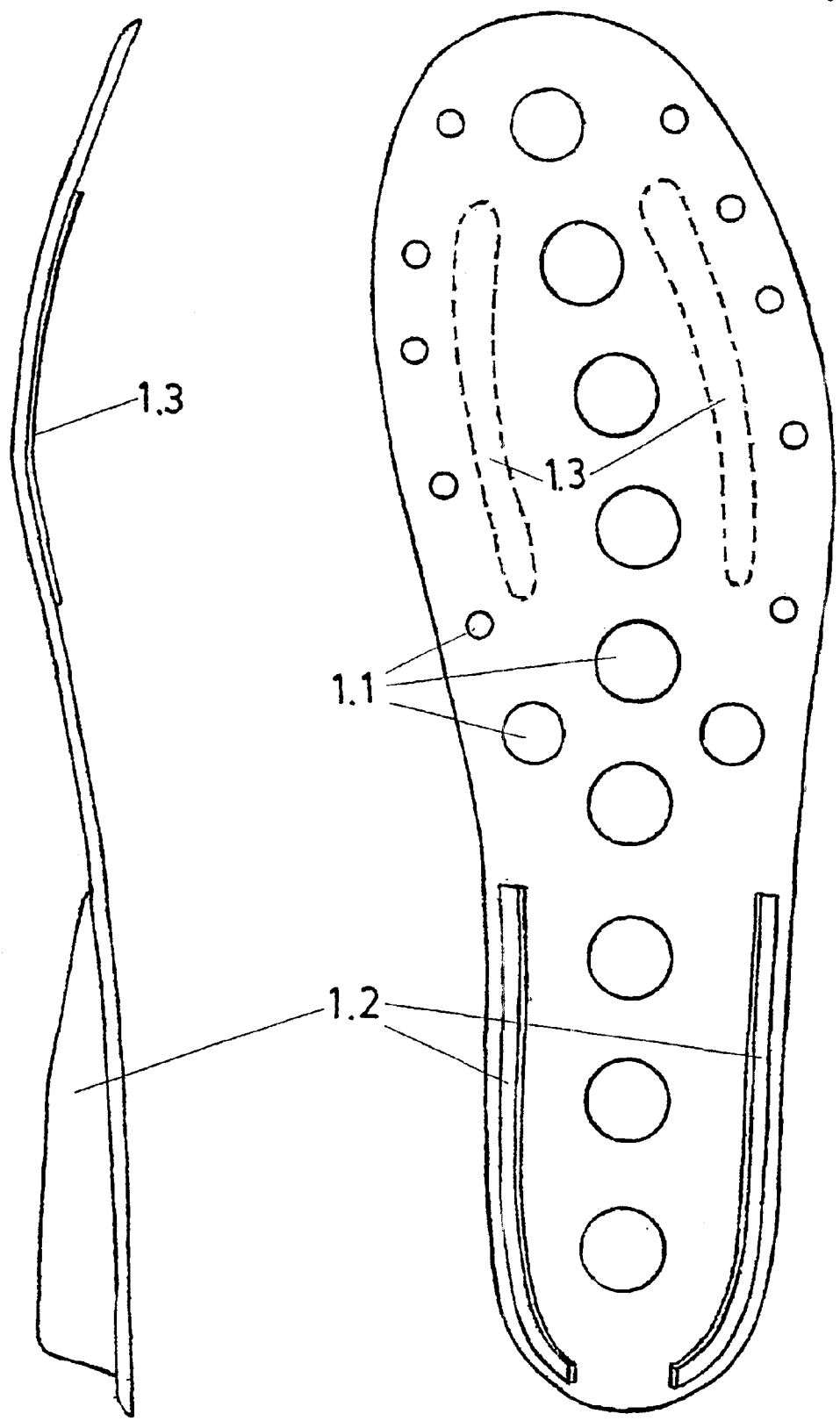
FIG. 2 is a longitudinal elevation view and bottom plan view of the midsole of this method.
Figure 3:
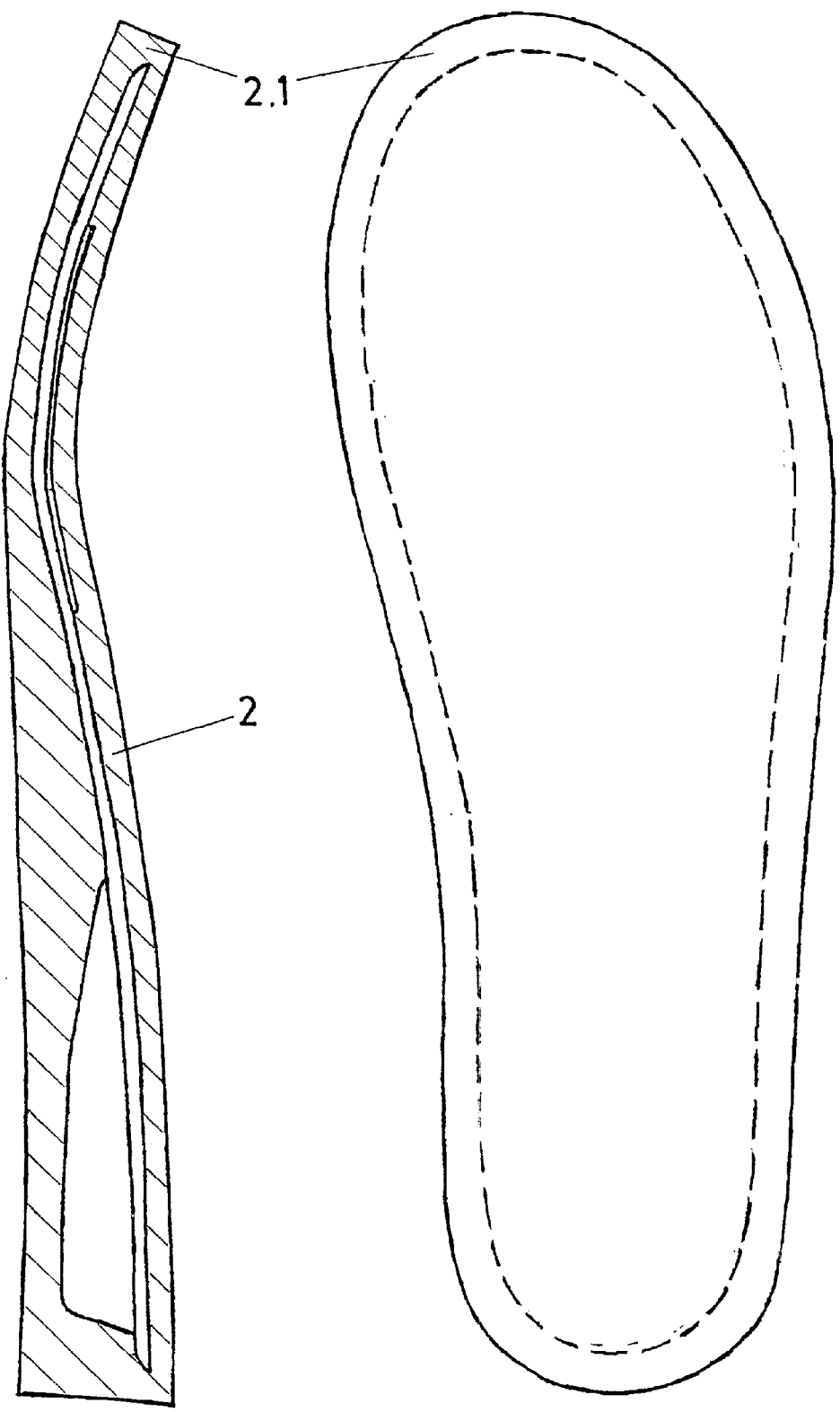
FIG. 3 shows the insole with the midsole already embedded in the same plastic material as that of the sole.

In view of the above, the present invention relates to a shoe construction method from among those of double injection for open, semiopen or closed shoes, as well as for shoes with a wedge and cut inserted in the mass of the sole or outsole, as well as if applicable for those shoes with wedges provided or not with an integrated midsole, essentially characterised in that it avoids the need to card the wedge and optimises the cut surface, as well as employing a single closure ring (4.1) per size in semimoulds (4) of the outsole or sole (3) of the shoe, regardless of its finish, whether open, semiopen or closed without upper leakage of the injected material.

The invention is also characterised by incorporating under wedge (2) a gridded stitching insole (6), either ribbed or not, which tightens cut (5) to which it is sewn, whether as a prefabricated part with edge closures which aid in this sewing or as a cut and ribbed fabric. As an option inside wedge (2) is placed a midsole (1) made of stiff plastic and multiperforated sheet (1.1) for passage of the low density thermoplastic of the coating (PU) and with two rear perimetral stiffening projections (1.2) with an irregular triangular shape which curve in the rear until they face each other at the end, aside from further upper stiffening ribs (1.3) outwardly convex, symmetrical about a longitudinal axis and placed on the bend of the sole, with midsole (1) inserted at a varying depth in wedge (2).

Sole or outsole (3) is made of the same plastic polymer family as wedge (2), albeit of high density.

Wedge (2) may or may not incorporate a lining with an edge extending downwards in its perimeter, with a constant height and which may be provided with a conventional upper insole.

The shoe is formed by depositing wedge (2), with or without midsole (1), under the last incorporating cut (5), sewn to a gridded insole (6) with the top surface of the closure ring (4.1) of semimould (4) of sole or outsole (3) to be injected even with the top edge of wedge (2), and then injecting the plastic of sole or outsole (3), of the same family as that of wedge (2) so that they fuse together and with the resulting set later incorporated or not to the bottom skid.

The essence of the invention is unaltered by variations in materials, shape, size or arrangement of the component elements, which are described in a nonlimiting manner and so that an expert in the field may reproduce it.

What is claimed is:

1. A method of constructing a shoe, the method comprising the steps of:
    (a) placing a cut around an edge of a wedge;
    (b) closing a semimould having a closure ring against said edge of said wedge such that said cut is held between said closure ring and said wedge;
    (c) injecting a plastic material into said semimould to form a sole, wherein said plastic material is of a same family as said wedge such that said sole and said wedge fuse together; and
    (d) removing said semimould.

2. The method according to claim 1, further comprising the step of sewing a stitching insole disposed under said wedge to said cut, wherein said stitching insole pulls on said cut.

3. The method according to claim 1, further comprising the step of placing a midsole comprising stiff plastic and multiperforated sheet inside said wedge wherein said multiperforated sheet allows for the passage of a thermoplastic material.

4. The method according to claim 1, wherein said sole is comprised of the same material as said wedge.

5. A shoe constructed in accordance with the method of claim 1.

* * * * *